No. 783,471. PATENTED FEB. 28, 1905.
A. SHAYNIN.
METALLIC PAIL.
APPLICATION FILED JUNE 16, 1904.
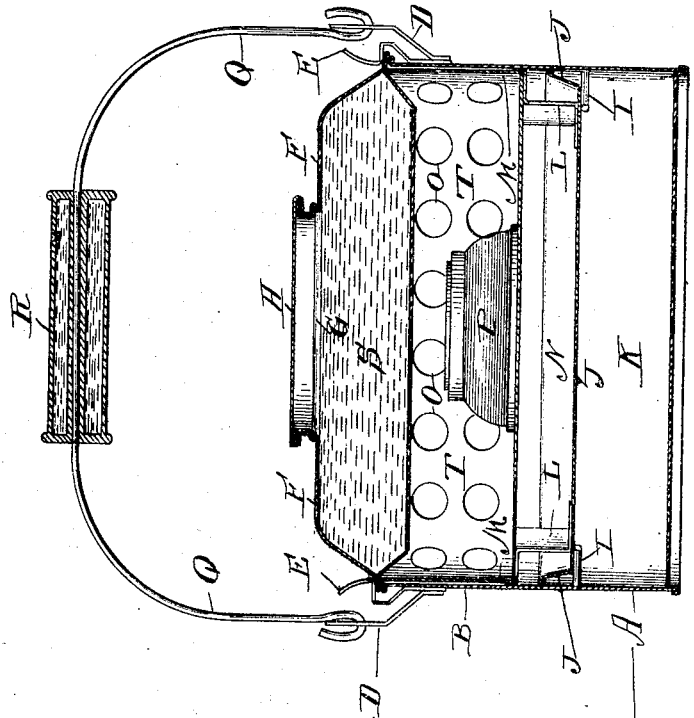
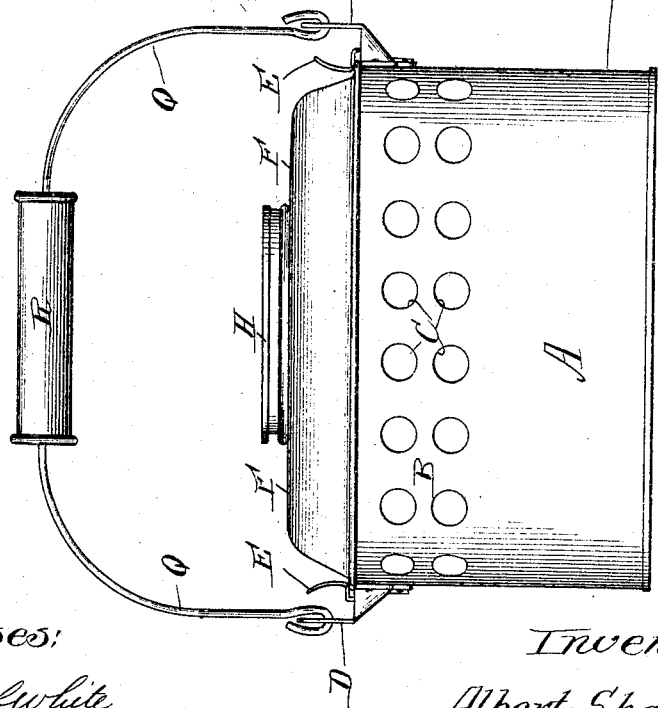
Witnesses:
Harry R. L. White
Ray White
Inventor:
Albert Shaynin
By Morgan & Rubinstein, Attys No. 783,471. Patented February 28, 1905.

UNITED STATES PATENT OFFICE.

ALBERT SHAYNIN, OF OAK PARK, ILLINOIS.

METALLIC PAIL.

SPECIFICATION forming part of Letters Patent No. 783,471, dated February 28, 1905.

Application filed June 16, 1904. Serial No. 212,848.

*To all whom it may concern:*

Be it known that I, ALBERT SHAYNIN, a citizen of the United States, whose residence and post-office address is No. 106 Kenilworth avenue, Oak Park, in the county of Cook and State of Illinois, have invented a new and useful Improvement in Metallic Pails, of which the following is a specification.

My improvement relates to that class of metallic pails known as "dinner-pails," used by work people to hold and carry the food required by them to their place of employment.

The object of my invention is to provide for separate compartments in the pail, three of which are adapted to contain food and one compartment for heating apparatus, to provide a cheap and ready means of heating or boiling fluid food and warming solid food within the pail, and thereby to provide for a hot meal at any time and in any place; also, to so construct the several parts of the pail as to permit of the cleansing of any part and of easy access to the food placed therein. The way in which I accomplish these objects is described in the following specification and shown in the accompanying drawings, in which—

Figure 1 is a side view, and Fig. 2 a longitudinal vertical sectional view, of its several parts.

The main body A is made of any suitable size, shape, and material, the upper part B having a number of perforations C sufficient for the free combustion of the fluid in a lamp hereinafter mentioned. The ears D are attached to the body A and adapted to permit the movement of the springs E, which are also affixed to the main body A.

The lid of the pail is a hollow vessel F, adapted in size and shape to fit into the main body A and to be held securely in place by the springs E. This vessel F is provided with a large aperture G, through which fluid or other food may be put in and removed from the vessel and which affords ample space for cleansing the interior. This aperture G is fitted with a hollow cover H, which may be used as a cup when detached.

In the interior of the main body A and affixed thereto are two or more projections I. These may be fixed at any suitable distance from the bottom of the pail and afford support to a removable shallow pan J, which covers the compartment K. The pan J is provided with projections L of any suitable height. These projections support a removable perforated open box M, which forms the top of the compartment N, the perforations O corresponding with the perforations C in the upper part B of the main body A. Into the open top of this box M the bottom of the vessel F projects, as shown in Fig. 2. Attached by suitable means to the bottom of the box M is a lamp P, adapted to burn any suitable fluid or substance, the flame of the lamp being so adjusted as to impinge on the bottom of the vessel F. On the handle Q of the pail and forming part thereof is a hollow vessel R adapted to contain a supply of burning fluid for the lamp P in the compartment T to heat the food S in the vessel F.

What I claim as new, and desire to secure by Letters Patent, is—

In a lunch-heater, the combination with the body of the heater provided with perforations near its upper portion, a pan supported within the body and spaced from the bottom thereof, a perforated box above said pan and supported thereon, the perforations in the box adapted to be brought into register with those of said body, a lamp within said box, and a hollow cover for the heater adapted to contain liquid food and supported above said lamp, substantially as described and for the purposes specified.

ALBERT SHAYNIN.

Witnesses:
W. E. KEELEY,
JULIUS RUBINSTEIN.